United States Patent [19]
Appenzeller, deceased et al.

[11] Patent Number: 4,709,629
[45] Date of Patent: Dec. 1, 1987

[54] ROLL WITH PRESSURE CHAMBER FOR DETECTION CONTROL

[75] Inventors: Valentin Appenzeller, deceased, late of Kempen; by Maria Appenzeller, heir, Kempen; by Regine Appenzeller, heir, Mitterfelden-Ainring; by Doris Pegels, heir; by Ernst Appenzeller, heir, both of Krefeld, all of Fed. Rep. of Germany

[73] Assignee: Eduard Küsters, Krefeld, Fed. Rep. of Germany

[21] Appl. No.: 870,446

[22] Filed: May 30, 1986

[30] Foreign Application Priority Data

May 30, 1985 [DE] Fed. Rep. of Germany ....... 3519318

[51] Int. Cl.⁴ .......................... B30B 3/04; F16C 13/02
[52] U.S. Cl. ........................... 100/162 B; 29/116 AD; 277/165; 384/481
[58] Field of Search ................. 29/113 AD, 116 AD; 100/155 R, 162 B, 176; 277/165, 205, 206 R; 384/481, 482, 139, 140, 558

[56] References Cited

U.S. PATENT DOCUMENTS

| | | |
|---|---|---|
| 3,081,102 | 3/1963 | Murray et al. |
| 4,281,447 | 9/1981 | Marchioro ................ 29/116 AD |
| 4,325,170 | 4/1982 | Verboom et al. ......... 29/116 AD |
| 4,414,890 | 11/1983 | Schiel et al. ................ 100/162 B |

FOREIGN PATENT DOCUMENTS

| | | |
|---|---|---|
| 1026609 | 3/1958 | Fed. Rep. of Germany. |
| 3128140 | 2/1983 | Fed. Rep. of Germany. |
| 3128722 | 2/1983 | Fed. Rep. of Germany. |
| 212779 | 8/1984 | German Democratic Rep. |

Primary Examiner—Werner H. Schroeder
Assistant Examiner—Andrew M. Falik
Attorney, Agent, or Firm—Kenyon & Kenyon

[57] ABSTRACT

In a floating roll the abutment faces of the transverse seals at the crosshead are not radial or axial but have an orientation corresponding to a spherical surface, the center of which is situated in the center of the adjacent bearing on which the cylinder is supported on the crosshead. When the crosshead flexes, the position of the transverse seal relative to the inner circumference of the cylinder and hence the abutment of the transverse seal at the inner circumference are not changed.

18 Claims, 7 Drawing Figures

ROLL WITH PRESSURE CHAMBER FOR DETECTION CONTROL

BACKGROUND OF THE INVENTION

This invention relates to a deflection controlled roll.

In a deflection controlled roll disclosed in West German Pat. No. 31 28 140, a longitudinal chamber enclosed by longitudinal and transverse seals extends over substantially the entire length of a rotable cylinder between two bearings which rotatably support the cylinder on a crosshead. On the side of the roll gap or nip, the pressure liquid contained in the longitudinal chamber exerts a uniform pressure against the inner surface of the cylinder. This pressure is absorbed by the crosshead, which accordingly flexes between the bearings. The bearings are disposed at the ends of the cylinder and constitute between the cylinder and the crosshead a connection fixed in the radial direction. The spaced support by the bearings is the reason for the distance between the crosshead and the inner surface of the cylinder.

Deflection controlled rolls may have lengths of up to 10 m when used, for example, in the paper industry. The maximum radial deflection on the outer side of a bending crosshead may be as much as 30 mm. The distance between the crosshead and the inner surface of the cylinder in the center must be at least as large as this maximum possible deflection.

In transverse planes longitudinally spaced from the center of the roll, the angles between the crosshead and the cylinder (which is not affected by the bend) may increase considerably upon large deflections of the crosshead's center portion. The seals which limit the longitudinal chamber must, of course, remain tight even during such displacements, as otherwise the operating pressure in the longitudinal chamber would collapse.

German Pat. No. 31 28 140 discloses a transverse seal formed as a gap seal, in which a predetermined spacing between the faces at the gap is maintained by a special antifriction bearing formed as part of the seal and bracing the parts defining the gap against one another. In addition, displacements between the crosshead and the cylinder are compensated by mobility of the various parts. In this transverse seal, the bearing has a large diameter and must be very precisely manufactured and fitted. The construction of the seal is accordingly rather costly and enters into consideration primarily in special cases.

Generally, the transverse seals in the above-described deflection controlled rolls are formed as sliding ring seals. German Pat. No. 10 26 609 schematically shows a radial sliding ring seal disposed in a radial groove in a crosshead. However, in practice a transverse seal is usually designed as an axial sliding ring seal having a radial sliding face which abuts in the axial direction against a ring provided in the vicinity of one of the bearings. Sliding ring seals can follow radial displacements of the crosshead and of the inner surface of the cylinder. If misalignments occur, as in the case of large deflections of the crosshead relative to the cylinder, the sliding rings, being guided in the crosshead, are carried along and tilted to a degree determined by the deflection of the crosshead. The result of this tilting is that only the edges of the sliding rings contact the counter-surfaces. This edge-wise contact leads to a great increase in the pressure per unit surface area in the contact zones and to correspondingly increased wear, which may greatly reduce the life of the seal.

In a roll disclosed in German Pat. No. 31 28 140, a longitudinal chamber extends over the full length of the cylinder between the bearings at the ends of the roll. The transverse seals are accordingly arranged directly next to respective bearings on the inner sides thereof. However, the above-described problem occurs not only with these transverse seals, but also when a plurality of longitudinal chambers are disposed one after the other in the axial direction, as in the case of a roll disclosed in German Pat. No. 31 28 722.

An object of the present invention is to provide an improved roll of the above-described type. A more particular object of the present invention is to provide such a roll in which the life of the transverse seals is not decreased by the deflections of the crosshead.

SUMMARY OF THE INVENTION

In accordance with the present invention, a deflection controlled roll juxtaposable to another roll to form a nip comprises a cylinder, a crosshead longitudinally traversing the cylinder, a pair of bearings disposed at opposite ends of the cylinder for rotatably supporting the cylinder on the crosshead, and at least one circumferentially extending transverse seal having a radially inner side engaging said crosshead and a radially outer side slidably engaging a surface contiguous with an inner surface of the cylinder. The transverse seal forms a boundary of a deflection control pressure chamber in the cylinder, one of the bearings being disposed on a side of the transverse seal opposite the pressure chamber. The transverse seal has, in accordance with the invention, an annular abutment surface engaging a respective annular contact surface of the crosshead, the abutment surface and the contact surface each having an orientation and shape conforming at least approximately to a spherical surface having a center at the geometric center of the transverse seal.

More specifically, the deflection control pressure chamber is formed between an outer surface of the crosshead and an inner surface of the cylinder and is defined in part by a pair of longitudinal seals connected to the crosshead and slidably engaging the inner surface of the cylinder, as well as by a pair of circumferentially extending transverse seals each having a radially inner side engaging the crosshead and a radially outer side slidably engaging a respective surface contiguous with the inner surface of the cylinder. Each of the support bearings has a respective geometric center, while each of the transverse seals has an annular abutment surface engaging a respective annular contact surface of the crosshead. The abutment surface of each of the transverse seals and the corresponding contact surface each have an orientation and shape conforming at least approximately to a spherical surface having a center at the geometric center of the one bearing disposed on a side of the respective transverse seal opposite the deflection control pressure chamber.

It is to be noted that the transverse seals provided at the end of the roll are urged axially outwardly under the action of the pressure prevailing in the longitudinal chamber.

Against this pressure the transverse seals are braced at the crosshead, i.e.. the seals abut against corresponding counter-surfaces of the crosshead. The same situation exists if the transverse seals are disposed, not exactly at the ends of the roll, but at points farther in. If two longitudinal chambers border on a transverse seal, generally one longitudinal chamber will have a higher pressure. Unless it is established from the start which of the longitudinal chambers contiguous to a certain transverse direction will have the higher pressure, the abutment faces must be formed in the manner according to the invention for the one and for the other direction.

Upon a flexing or bending of the crosshead, every point of the crosshead shifts along a spherical surface, the center of which surface coincides with the geometrical center of the adjacent bearing. Accordingly, in a roll according to the invention the orientation of the transverse seal does not change relative to its counter-surface on the cylinder during a deflection of the crosshead but instead always encounters the same abutment conditions. The abutment surface of the transverse seal simply engages the contact surface of the crosshead at a different point, and otherwise no influence is exerted on the transverse seal. In this manner the full-area engagement of the sliding surface of the transverse seal with its counter-surface on the inner side of the cylinder is maintained even during deflections of the crosshead and the problems connected with tilting are avoided.

The ideal state exists when the abutment and contact surfaces of the transverse seal and the crosshead are actually spherical sectors. Inasmuch as the radii of the spherical surfaces in deflection controlled rolls are usually large in proportion to their extent in the circumferential direction, the approximation of the abutment and contact surfaces by conical surfaces is generally sufficient. Calculation shows that the radial errors of a conical surface with respect to a spherical surface in the region of an abutment face of the size involved are minimal, in the micron range, and within expected manufacturing tolerances.

Pursuant to further features of the present invention, the abutment surface of each transverse seal constitutes one of a pair of lateral annular faces of the respective seal. Each transverse seal is partially disposed in a respective annular groove in the crosshead, the groove having a pair of parallel annular walls substantially engaging respective lateral annular faces of the transverse seal. The contact surfaces of the crosshead constitute respective annular walls of the annular grooves.

The grooves may be provided in respective transverse faces of the crosshead. In this case each of the transverse seals is juxtaposed to a respective bearing, each bearing having an outer ring fixed to the cylinder and each of the transverse seals engaging at an outer side the outer ring of the juxtaposed bearing. In addition, an elastic sealing strip is advantageously disposed between an outer surface of the crosshead and an inner surface of the cylinder at the respective transverse end face of the crosshead.

In accordance with yet another feature of the present invention, each transverse seal is provided on a radially inner side with an annular groove defined in part by the abutment surface of the respective transverse seal. The crosshead may be provided in this case with annular flanges each partially disposed in the annular groove of a respective transverse seal. Each flange has a respective surface constituting the contact surface corresponding to the respective transverse seal.

In accordance with a particular feature of the invention, a connecting channel is provided in the crosshead for pressurizing one of the transverse seals on a radially inner side thereof, the connecting channel communicating with the deflection control pressure chamber.

DETAILED DESCRIPTION

Figure 1:
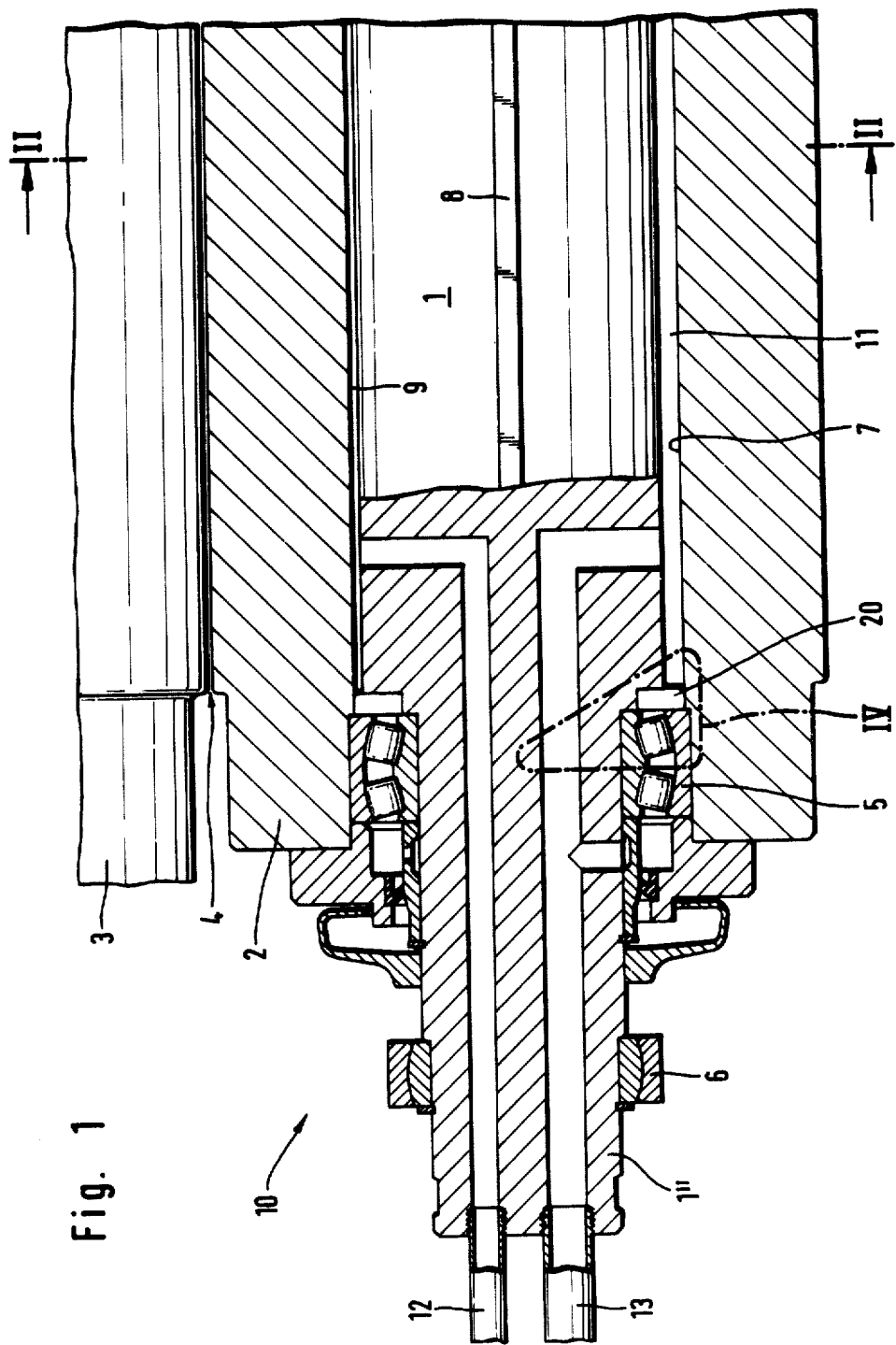
FIG. 1 is a partial longitudinal cross-sectional view of an end portion of a roll according to the present invention.
Figure 2:
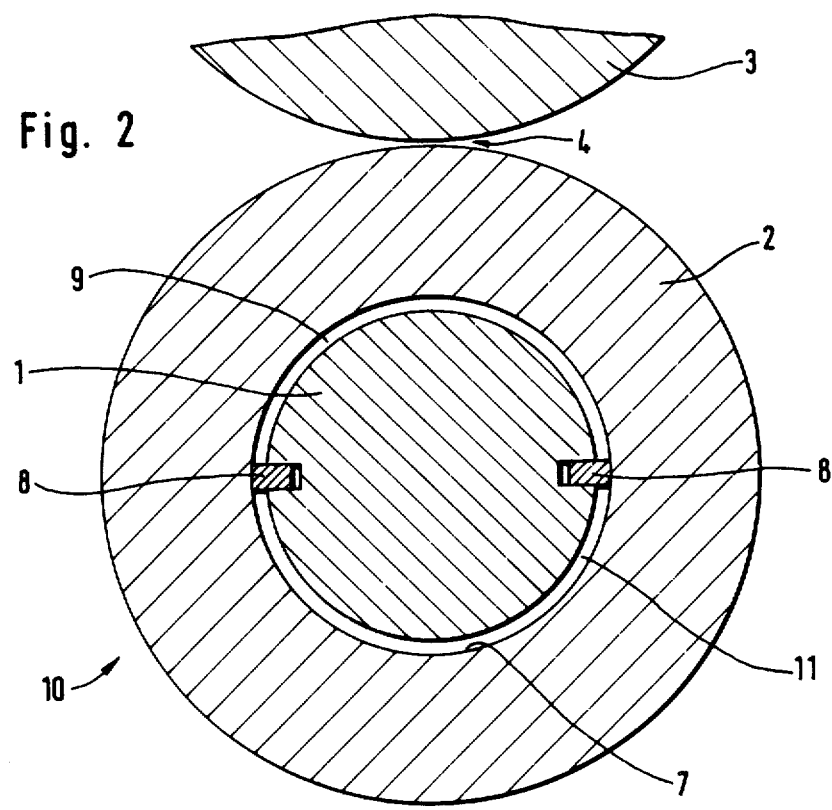
FIG. 2 is a transverse cross-sectional view taken along line II—II in FIG. 1.

A roll assembly 10 shown in FIG. 1 comprises a fixed crosshead 1 longitudinally traversing a rotatable cylinder 2 having an outer circumferential surface which forms the working roll surface and which cooperates with a counter-roll 3 to form a roll gap or nip 4. Cylinder 2 is rotatably supported at its opposite ends via bearings 5 on crosshead 1. The bearings are antifriction bearings with spherical rolling surfaces. At ends 1" protruding from cylinder 2, crosshead 1 is supported by spherical bearings 6 in a roll housing (not shown).

In the interior of cylinder 2, between bearings 5, crosshead 1 is spaced from an inner surface 7 of cylinder 2. At crosshead 1, on either side of nip 4, i.e., symmetrically to a plane defined by the axes of rolls 10 and 3, longitudinal seals 8 are disposed, which seals are indicated schematically in the drawing as seal strips mounted in longitudinal grooves in crosshead 1 and whose specific design is not material to the present invention. Longitudinal seals 8 divide the cylindrical space between crosshead 1 and inner surface 7 of cylinder 2 into a first longitudinal chamber 9 on the side of nip 4 and a second longitudinal chamber 11 on the opposite side.

Longitudinal seals 8 each extend between a pair of annular or circumferential transverse seals 20 juxtaposed to respective bearings 5 and cooperate with the transverse seals for sealing purposes. In FIG. 1 transverse seals 20 are indicated schematically as rectangles. The actual structures of the seals are illustrated in detail in FIGS. 4 to 7.

Upper longitudinal chamber 9 (FIG. 1) is connected via a feed line 12 to a source (not shown) of pressurized liquid. Inasmuch as longitudinal chamber 9 is sealed by longitudinal seals 8 and transverse seals 20, a pressure arises in the chamber and acts against inner surface 7 of cylinder 2 toward nip 4 upon a supplying of pressure liquid via line 12. In this manner the line pressure is exerted on counter-roll 3. The counter-pressure is absorbed by crosshead 1, which deflects in a direction opposite to nip 4 owing to the crosshead being radially fixed relative to cylinder 2 by bearings 5 at the opposite ends of the crosshead. It is to be noted that the design of roll 10 is essentially the same at opposite ends of the roll, in particular with regard to bearings 5.

The seal formed by longitudinal seals 8 and transverse seals 20 need not be hermetic. Sufficient pressure can be built up in the longitudinal chamber 11 with reasonable pumping work and is removed by a drain 13. In some cases a pre-established pressure is purposely maintained in longitudinal chamber 11, so that the pressure occurring at nip 4 is determined by the difference in the pressures in longitudinal chambers 9 and 11.

It is not necessary for longitudinal seals 8 to be disposed exactly opposite each other: longitudinal chamber 9 may have an angular extent less than 180°. In addition, although only one transverse seal 20 disposed in the vicinity of bearing 5 is shown, longitudinal chamber 9 (as well as longitudinal chamber 11) may be subdivided in the longitudinal direction by additional transverse seals (not shown) to form a series of individual chambers one behind the other separately supplied with pressurized liquid, in which chambers different pressures can be developed.

Figure 3:
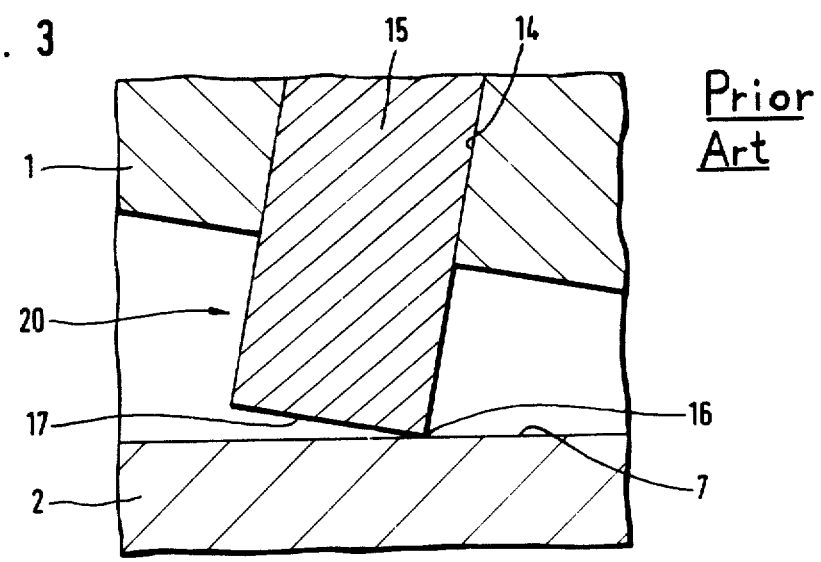
FIG. 3 is a partial longitudinal cross-sectional view, on an enlarged scale, of a portion of a conventional transverse seal, showing an undesirable tilting of the seal when a crosshead bends.

FIG. 3 illustrates schematically and in an exaggerated manner a problem which occurs in prior art rolls when transverse seals 20 are formed as slide rings 15 disposed and radially guided in radial grooves 14 in crosshead 1. Upon a bending of crosshead 1 under the line pressure, transverse seal 20 is tilted in the schematically indicated manner and engages inner surface 7 of cylinder 2 only along an edge 16 and not along the entire sliding surface 17. This tilting of seal 20 causes in the region of edge 16 a high compression across the edges and increased wear. Such a result is to be avoided.

Figure 4:
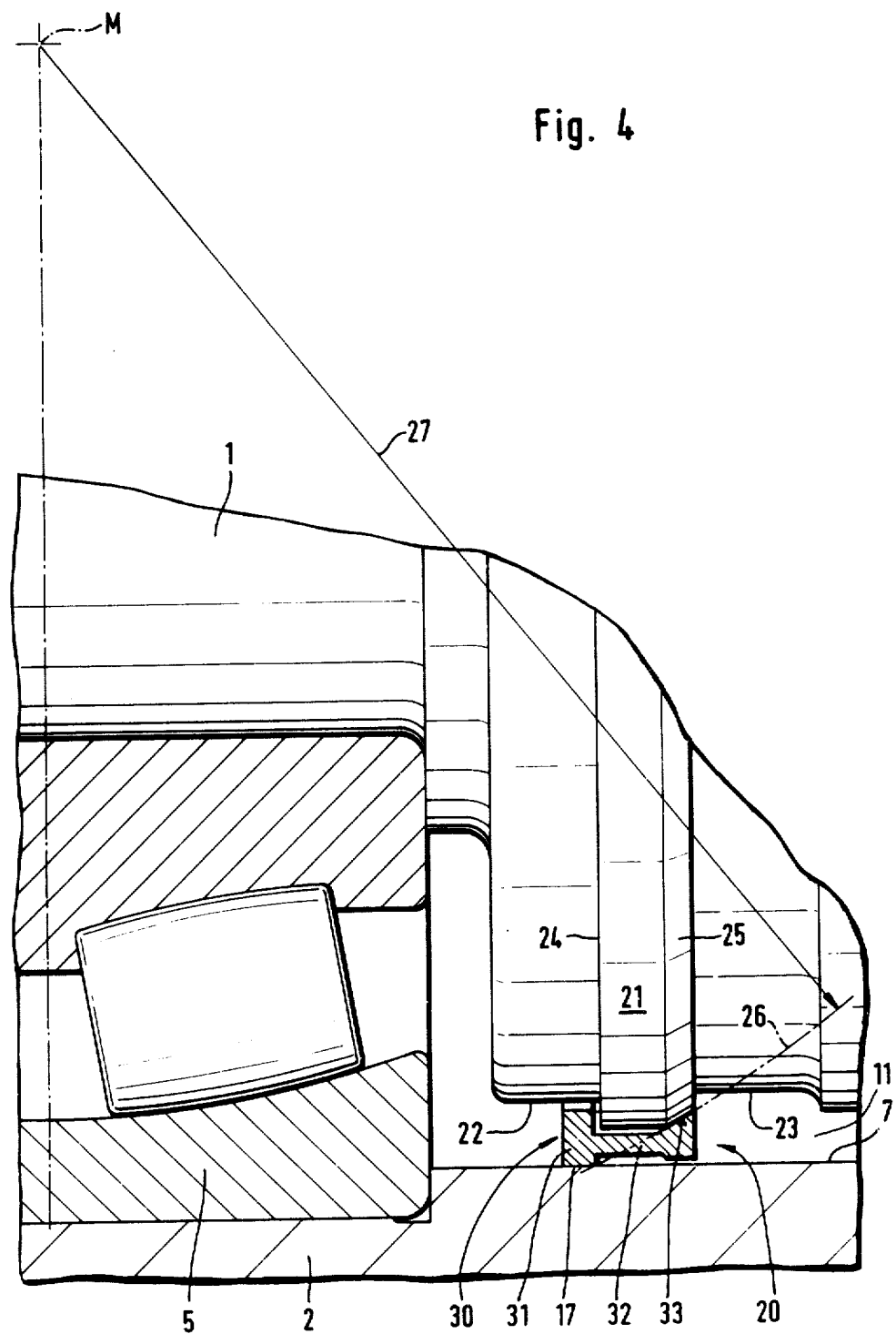
FIG. 4 shows in detail a region designated IV in FIG. 1 and illustrates a first embodiment of a transverse seal according to the present invention.

As indicated in the large scale detail view of FIG. 4, bearing 5 has a geometric center M. On crosshead 1, proximate to bearing 5, is a circumferential peripheral flange 21 formed by peripheral grooves 22 and 23 in the circumference of crosshead 1 on either side of the peripheral flange 21. On a side facing the adjacent bearing 5, peripheral flange 21 has a radial surface 24 and on a side facing longitudinal chambers 9 and 11 an abutment or contact surface 25, flange 21 being provided between the lateral surfaces 24 and 25 with a cylindrical outer circumference.

The orientation and shape of abutment or contact surface 25 at least approximates a section of an imaginary spherical surface 26 with a radius 27 and a center which coincides with the center M of bearing 5. Contact surface 25 has an inclination with respect to the axis of crosshead 1 which is substantially the same as the inclination of a corresponding annular sector of spherical surface 26. Spherical surface 26 intersects the sectional plane of FIG. 4 along a circular line, partially indicated in FIG. 4.

In most applications, contact surface 25 is not a spherical surface, but a conical surface, tangential at some point to spherical surface 26. It is to be noted that the radial deviations of conical surface 25 relative to spherical surface 26 are minimal and are within the range of the manufacturing tolerances, inasmuch as radius 27 of spherical surface 26 is large relative to the width of contact surface 25.

Upon a flexing of crosshead 1, contact surface 25 shifts along spherical surface 26. Abutment surface 33 of ring 30 then strikes against a different point of contact surface 25 but otherwise encounters exactly the same conditions, with the result that there is no change in the orientation of ring 30, the ring is not taken along by the deflected crosshead 1, and full-area contact at seal surface 17 is preserved. As depicted in FIG. 4, ring 30 includes an annular first portion 31 provided with sliding surface 17 which contacts inner surface 7 of cylinder 2. An annular second portion 32 of ring 30 connects first portion 31 to abutment surface 33.

Figure 5:
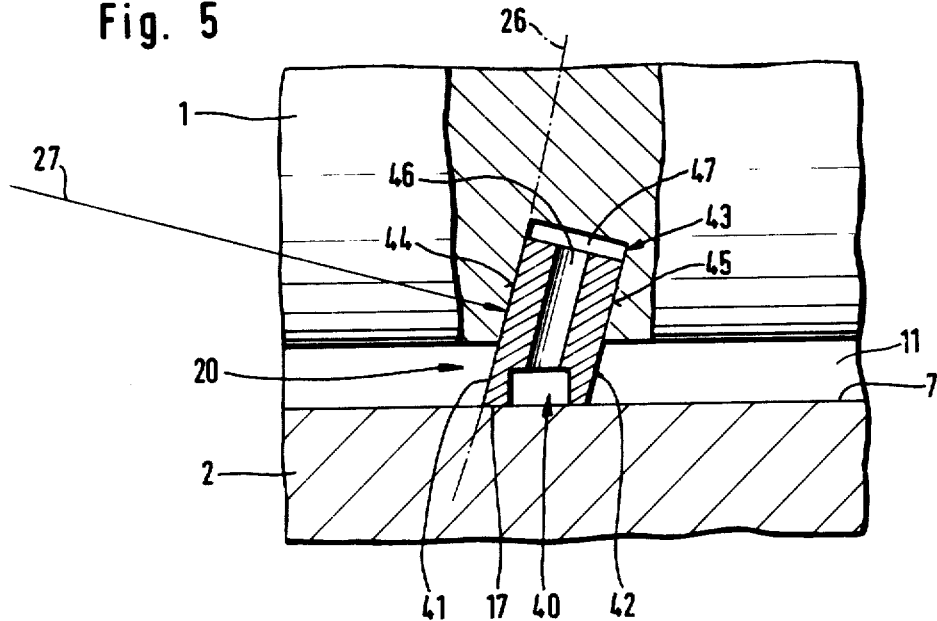
FIGS. 5 through 7 are detailed views similar to FIG. 4, showing alternative embodiments of a transverse seal pursuant to the invention.

In FIG. 5, transverse seal 20 is comprised by a ring 40 having limiting or lateral faces 41 and 42 in the form of mutually parallel conical surfaces spaced from one another in the longitudinal direction. Ring 40 is guided by means of lateral faces 41 and 42 in a substantially radial groove 43 in crosshead 1 for engagement with inner surface 7 of cylinder 2. Lateral faces 41 and 42 are the abutment surfaces of ring 40, while flanks or walls 44 and 45 of groove 43 are the contact surfaces thereof. Surfaces 41, 42 and 44, 45 extend, not radially, but obliquely as an approximation of imaginary spherical surface 26 with radius 27 and geometric center M as in FIG. 4. Spherical surface 26 touches flank 44 of groove 43 in the region in which ring 40 abuts thereon. When crosshead 1 flexes, nothing changes in the position of ring 40 relative to inner surface 7 of cylinder 2.

In the embodiment illustrated in FIG. 5, a connecting channel 46 is provided which leads from seal face 17 of ring 40 into a chamber 47 formed on the ring's radially inner side, i.e., on the bottom of groove 43. Into this chamber 47 oil passes from longitudinal chamber 11 through a gap between lateral face 42 and flank 45, ring 40 being seated in groove 43 with a lateral clearance of approximately 0.3 mm. This passage of oil causes pressure to build up in chamber 47 which pressure forces ring 40 out of groove 43 against inner surface 7 of cylinder 2 and which pressure is approximately proportional to the pressure against which transverse seal 20 must seal.

Figure 6:
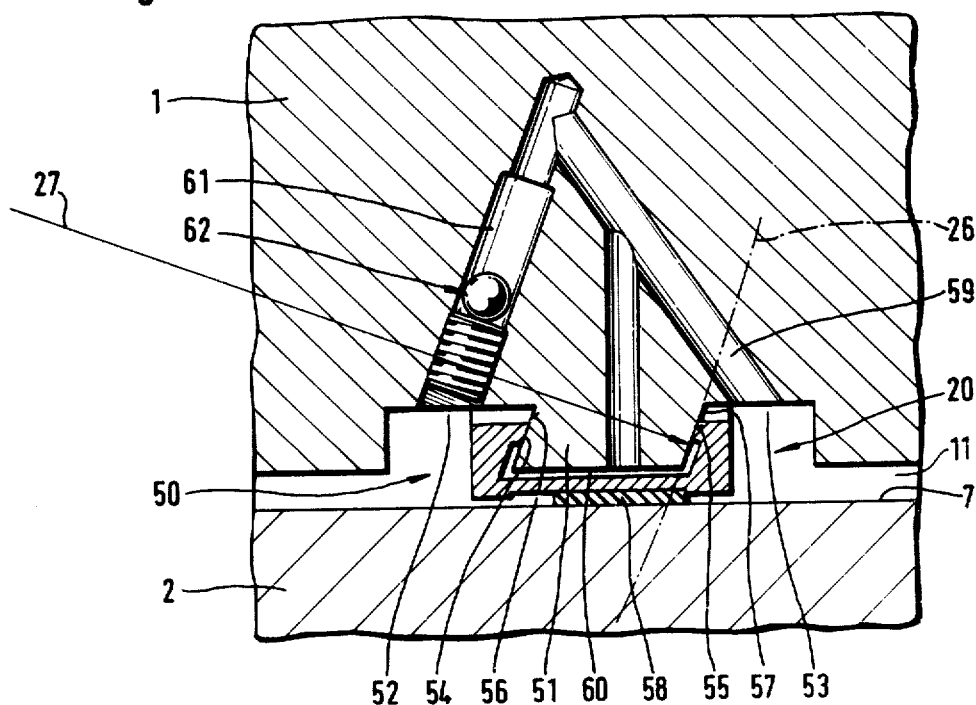

In FIG. 6, transverse seal 20 is formed as a ring 50 cooperating with a peripheral annular flange or web 51 of crosshead 1, which flange is formed by laterally adjacent circumferential grooves 52 and 53 in crosshead 1. Ring 50 has an approximately U-shaped cross-section and has abutment surfaces 54 and 55 engaging contact surfaces 56 and 57 formed by lateral faces of peripheral flange 51. On the cylindrical outer surface of ring 50 is provided a sliding circumferential sealing strip 58. The shapes and oblique orientations of abutment surface 55 and of contact surface 57 approximate imaginary spherical surface 26 (center at bearing center M). Surfaces 54 and 56 approximate a spherical surface (not indicated in the drawing) of slightly smaller radius having a center at bearing center M. The surfaces 54–57 are tangential to the respective spherical surfaces.

As illustrated in FIG. 6, a connecting channel 59 leads into a chamber 60 on the radially inner side of ring 50, whereby the ring is pressed by a higher pressure against inner surface 7 of cylinder 2. To prevent the higher pressure from blowing off, a ball check valve 62 secures an oblique bore 61, which bore is necessary for manufacturing reasons. The ball check valve by-passes transverse seal 20 in the region with the lower pressure.

Figure 7:
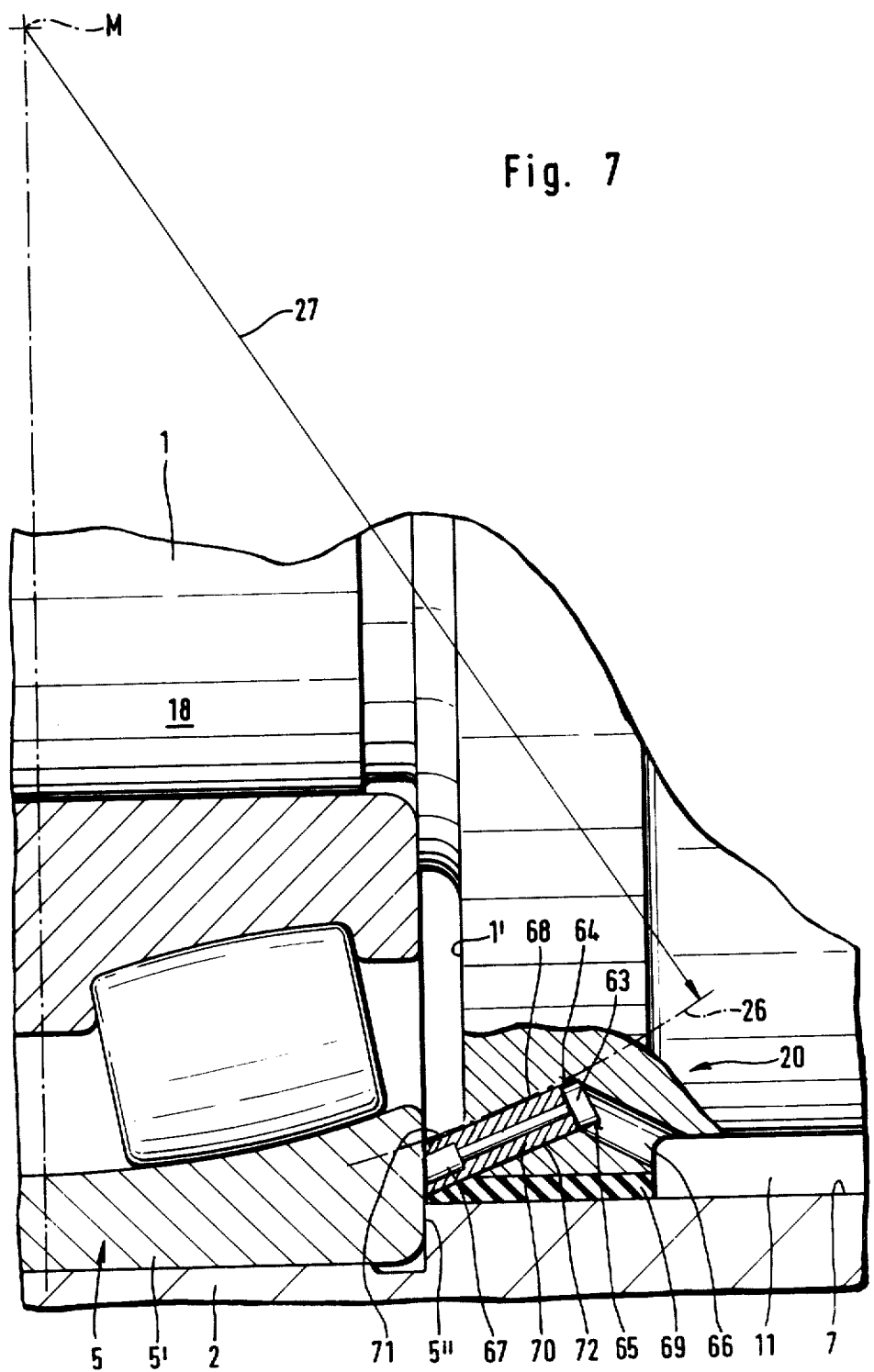

The embodiment of transverse seal 20 shown in FIG. 7 utilizes the fact that bearings 5 are arranged on the journal of crosshead 1, i.e.. on a shoulder 18 thereof, and that a central portion of crosshead 1 situated between bearings 5 in the region of longitudinal chamber 11 has a larger diameter than that of shoulder 18. An end face 1' of the central portion of crosshead 1 is directly opposite an inner end face of bearing 5.

As illustrated in FIG. 7, transverse seal 20 comprises a ring 70 with mutually parallel conical limiting surfaces 71 and 72, the cones represented by those limiting surfaces forming with the axis of the crosshead an acute angle of preferably approximately 25°. Ring 70 is seated in a correspondingly dimensioned and oriented groove 63 in end face 1' of crosshead 1. Groove 63 has lateral contact surfaces or walls 64 and 65, surface 64 extending obliquely in approximation of spherical surface 26.

The base of groove 63 communicates via a channel 66 with longitudinal chamber 11. Ring 70 protrudes from groove 63 against and end face 5" of an outer bearing ring 5' of bearing 5, ring 5' being connected to cylinder 2. To that extent bearing ring 5' is regarded as part or a continuation of inner surface 7 of cylinder 2. The pressure of the oil against radially outer surface 72 of ring 70 holds the ring in abutment against end face 5" of bearing ring 5'. On its abutment side, ring 70 has an annular chamber 67 extending over the circumference of ring 70, which chamber is supplied via a small channel 68 extending from the bottom of groove 63, with oil which serves for lubrication.

Between the outer cylindrical surface of crosshead, near end face 1', and inner surface 7 of cylinder 2, there is provided an elastic strip 69 which extends into the gusset between ring 70 and inner surface 7 of cylinder 2 and which supports the seal against pressure in longitudinal chamber 11.

The embodiments shown in FIGS. 4-7 are intended for the left side of the roll in FIG. 1, i.e., the orientation of the abutment faces approximates the orientation, a spherical surface having a geometric center M coinciding with the center of the left bearing 5 seen in FIG. 1. The transverse seals in the right half of roll 10 according to FIG. 1 have a different orientation depending on the center of the right bearing (not shown in FIG. 1). The material of the rings 30, 40, 50, 70 is a suitable bronze.

Although the invention has been described in terms of particular embodiments and modifications, one of ordinary skill in the art, in light of this teaching, can generate additional embodiments and modifications without departing from the spirit of or exceeding the scope of the claimed invention. Accordingly, it is to be understood that the descriptions and illustrations herein are profered by way of example to faciliate comprehension of the invention and should not be construed to limit the scope thereof.

What is claimed is:

1. A deflection controlled roll juxtaposable to another roll to form a nip, said deflection controlled roll comprising:

a cylinder;

a crosshead longitudinally traversing said cylinder, said crosshead having an outer surface, said cylinder being rotatably mounted on said crosshead, said cylinder having an inner surface spaced from said outer surface of said crosshead;

a pair of longitudinal seals connected to said crosshead and slidably engaging said inner surface of said cylinder;

a pair of circumferentially extending transverse seals each having a radially inner side engaging said crosshead and a radially outer side slidably engaging a respective surface contiguous with said inner surface of said cylinder, said longitudinal seals and said transverse seals cooperating with each other, with an outer surface of said crosshead and with said inner surface of said cylinder to form a longitudinal chamber at the nip between the two rolls, said crosshead being provided with means including a conduit communicating with said longitudinal chamber for enabling pressurization of said longitudinal chamber with a pressure fluid; and support means comprising a pair of bearings disposed at respective ends of said cylinder for rotatably supporting said cylinder on said crosshead, each of said bearings having a respective geometric center, each of said transverse seals having an annular abutment surface engaging a respective annular contact surface of said crosshead, the abutment surface of each of said transverse seals and the corresponding contact surface each having an orientation and shape conforming at least approximately to a spherical surface having a center at the geometric center of the one of said bearings disposed on a side of the respective transverse seal opposite said longitudinal chamber.

2. The deflection controlled roll defined in claim 1 wherein the abutment surface of each of said transverse seals and the corresponding contact surface take the form of spherical surface sectors.

3. The deflection controlled roll defined in claim 1 wherein the abutment surface of each of said transverse seals and the corresponding contact surface take the form of conical surfaces extending tangentially to the respective spherical surface.

4. The deflection controlled roll defined in claim 1 wherein each of the abutment surfaces constitutes one of a pair of lateral annular faces of the respective transverse seal.

5. The deflection controlled roll defined in claim 4 wherein each of said transverse seals is partially disposed in a respective annular groove in said crosshead, said groove having a pair of parallel annular walls substantially engaging respective ones of said lateral annular faces of the respective transverse seal, said contact surface constituting one of said walls.

6. The deflection controlled roll defined in claim 5 wherein said groove is in a respective transverse face of said crosshead.

7. The deflection controlled roll defined in claim 6 wherein each of said transverse seals is juxtaposed to a respective one of said bearings, each of said bearings having an outer ring fixed to said cylinder, each of said transverse seals engaging at an outer side the outer ring of the juxtaposed bearing.

8. The deflection controlled roll defined in claim 6, further comprising an elastic sealing strip disposed between an outer surface of said crosshead and an inner surface of said cylinder at the respective transverse end face of said crosshead.

9. The deflection controlled roll defined in claim 5 wherein said groove is disposed at a longitudinal cylindrical surface of said crosshead.

10. The deflection controlled roll defined in claim 1 wherein each of said transverse seals is provided on a radially inward side with an annular groove, said groove being defined in part by the abutment surface of the respective transverse seal.

11. The deflection controlled roll defined in claim 10 wherein said crosshead is provided with a pair of annular flanges each partially disposed in the annular groove of a respective one of said transverse seals, each of said annular flanges having a respective surface constituting the contact surface corresponding to the respective transverse seal.

12. The deflection controlled roll defined in claim 11 wherein the annular grooves of said transverse seal are each defined by a pair of opposed surfaces, one of said opposed surfaces constituting the contact surface corresponding to the respective transverse seal, each of said annular flanges having a pair of opposed surfaces engaging respective opposed surfaces of said transverse seals.

13. The deflection controlled roll defined in claim 11 wherein said annular flanges are each formed by a pair of annular grooves on opposite sides of the respective one of said flanges.

14. The deflection controlled roll defined in claim 1, further comprising means disposed at least partially in said crosshead for pressurizing said transverse seals on radially inner sides thereof.

15. The deflection controlled roll defined in claim 14 wherein said means for pressurizing includes in said crosshead a connecting channel communicating with said longitudinal chamber.

16. The deflection controlled roll defined in claim 15 wherein said channel also communicates with a chamber formed on a radially inner side of a respective one of said transverse seals.

17. In a deflection controlled roll juxtaposable to another roll to form a nip, said deflection controlled roll comprising a cylinder, a crosshead longitudinally traversing said cylinder, support means comprising a pair of bearings disposed at respective ends of said cylinder for rotatably supporting said cylinder on said crosshead, and at least one circumferentially extending transverse seal having a radially inner side engaging said crosshead and a radially outer side slidably engaging a surface contiguous with an inner surface of said cylinder, said transverse seal forming a boundary of a reflection control pressure chamber in said cylinder, one of said bearings disposed on a side of said transverse seal opposite said chamber having a geometric center, the improvement wherein said transverse seal has an annular abutment surface engaging a respective annular contact surface of said crosshead, said abutment surface and said contact surface each having an orientation and shape conforming at least approximately to a spherical surface having said geometric center as a center.

18. A deflection controlled roll juxtaposable to another roll to form a nip, said deflection controlled roll comprising:
a cylinder;
a crosshead longitudinally traversing said cylinder, said cylinder being rotatably mounted on said crosshead, said cylinder having an inner surface spaced from said crosshead;
a pair of longitudinal seals connected to said crosshead and slidably engaging said inner surface of said cylinder;
a pair of circumferentially extending transverse seals each having a radially inner side engaging said crosshead and a radially outer side slidably engaging a respective surface contiguous with said inner surface of said cylinder, said longitudinal seals and said transverse seals cooperating with each other, with said crosshead and with said inner surface of said cylinder to form a longitudinal chamber at the nip between the two rolls, said crosshead being provided with means including a conduit communicating with said longitudinal chamber for enabling pressurization of said longitudinal chamber with a pressure fluid; and
support means comprising a pair of bearings disposed at respective ends of said cylinder for rotatably supporting said cylinder on said crosshead, each of said bearings having a respective geometric center, at least one of said transverse seals having an annular abutment surface engaging a respective annular contact surface of said crosshead, one of said bearings being disposed on a side of said one of said transverse seals opposite said longitudinal chamber, said abutment surface and said contact surface each having an orientation and shape conforming at least approximately to a spherical surface having a center at the geometric center of said one of said bearings.

* * * * *

UNITED STATES PATENT AND TRADEMARK OFFICE
CERTIFICATE OF CORRECTION

PATENT NO. : 4 709 629

DATED : December 1, 1987

INVENTOR(S) : VALENTIN APPENZELLER (deceased)

It is certified that error appears in the above-identified patent and that said Letters Patent is hereby corrected as shown below:

On the Title Page

In the table of contents change "[54] ROLL WITH PRESSURE CHAMBER FOR DETECTION CONTROL" to read

--[54] ROLL WITH PRESSURE CHAMBER FOR DEFLECTION CONTROL--

In column 1, lines 2-3, change "ROLL WITH PRESSURE CHAMBER FOR DETECTION CONTROL" to read

-- ROLL WITH PRESSURE CHAMBER FOR DEFLECTION CONTROL--

In column 9, line 29, change "reflection" to read --deflection--

Signed and Sealed this

Fourteenth Day of June, 1988

Attest:

DONALD J. QUIGG

Attesting Officer

Commissioner of Patents and Trademarks